DE WITT O. MAKEAN.
MECHANICAL MOVEMENT.
APPLICATION FILED NOV. 13, 1907.
923,191.
Patented June 1, 1909.
2 SHEETS—SHEET 1.
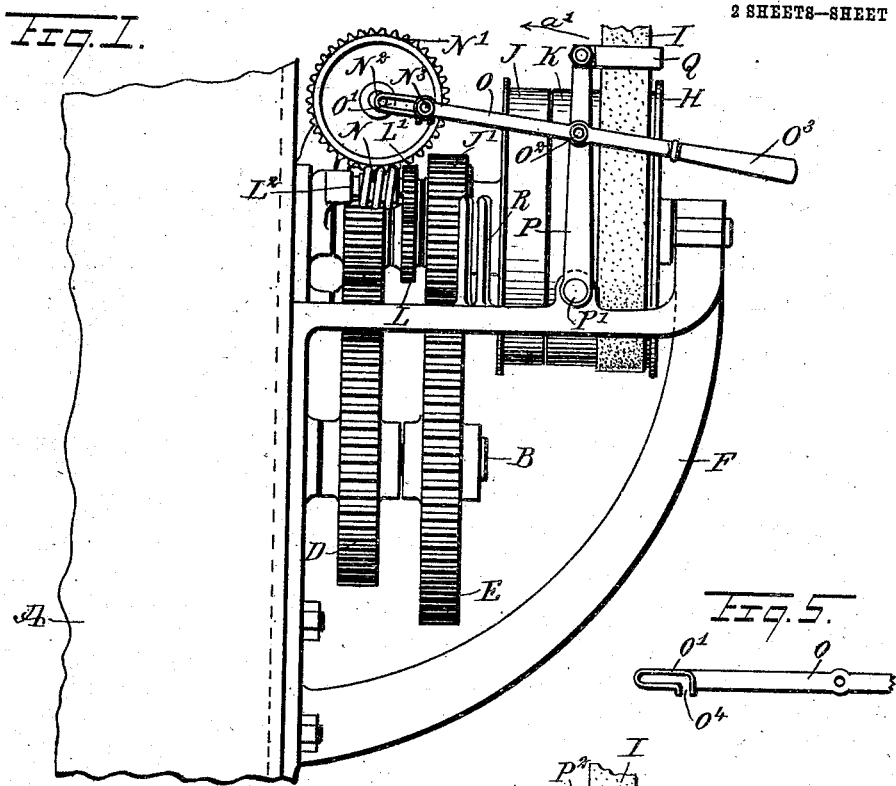
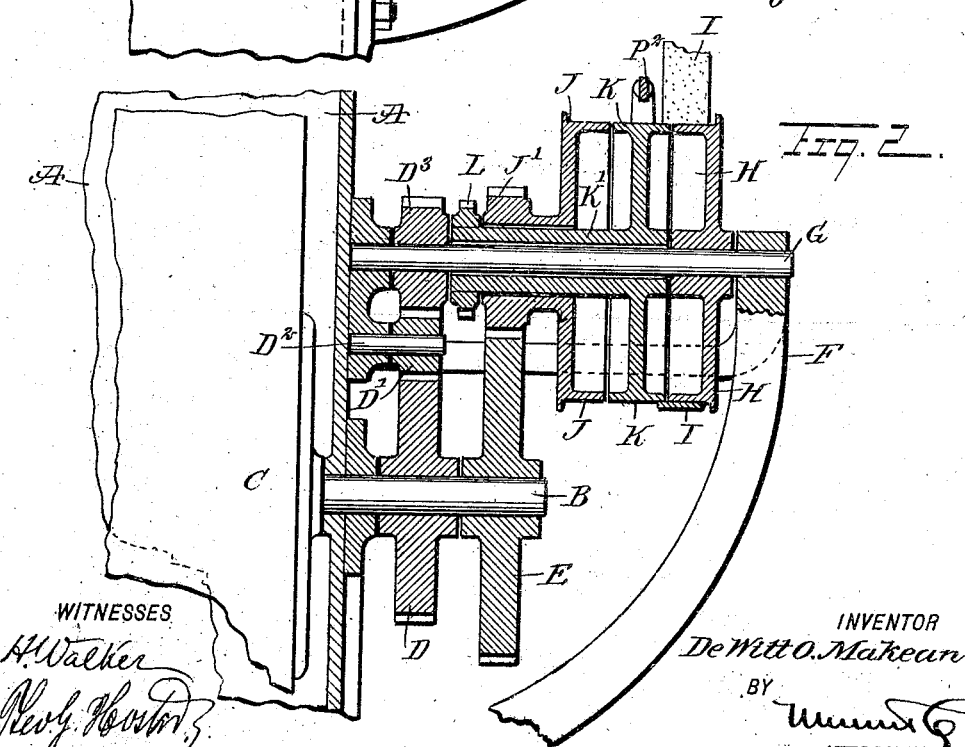

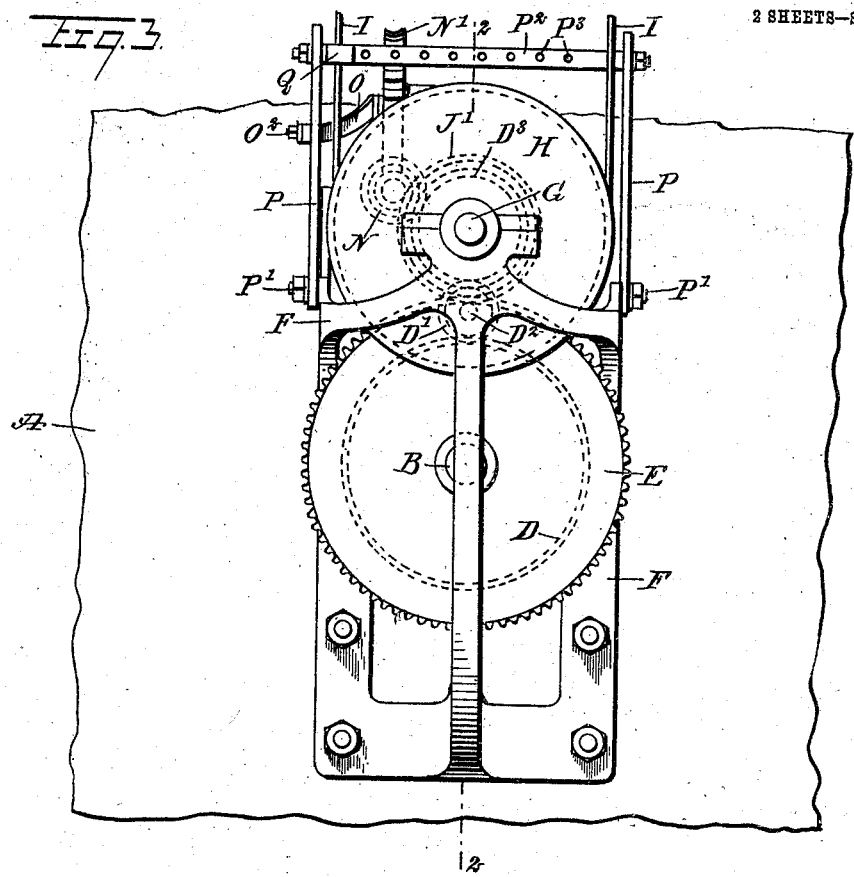
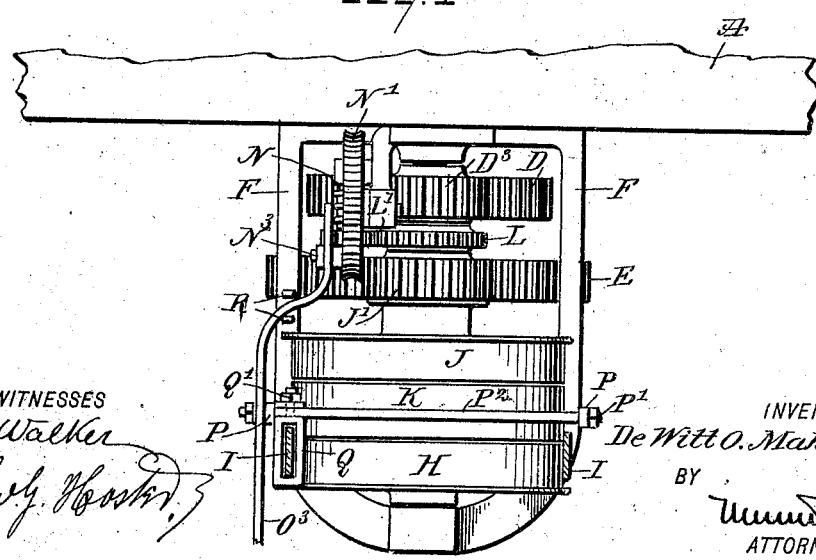

UNITED STATES PATENT OFFICE.

DE WITT OTIS MAKEAN, OF BINGHAMTON, NEW YORK, ASSIGNOR OF TWENTY-FIVE ONE-HUNDREDTHS TO HALBERT A. LACEY, OF BINGHAMTON, NEW YORK.

MECHANICAL MOVEMENT.

No. 923,191.  Specification of Letters Patent.  Patented June 1, 1909.

Application filed November 13, 1907.  Serial No. 401,958.

*To all whom it may concern:*

Be it known that I, DE WITT O. MAKEAN, a citizen of the United States, and a resident of Binghamton, in the county of Broome and State of New York, have invented a new and Improved Mechanical Movement, of which the following is a full, clear and exact description.

The object of the invention is to provide a new and improved mechanical movement for converting continuous rotary motion in one direction into alternate forward and backward rotary movement, thus rendering the device very serviceable for use in washing machines, churns and other machines.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied; Fig. 2 is a sectional side elevation of the same, on the line 2—2 of Fig. 3; Fig. 3 is an end elevation of the same; Fig. 4 is a plan view of the same, and Fig. 5 is a side elevation of the link for actuating the shifter lever.

As illustrated in the drawings, the mechanical movement is applied to a washing machine having a casing A, in which is journaled a shaft B, carrying the drum or cylinder C, to be rotated alternately in opposite directions.

On the shaft B are secured the gear wheels D and E, of which the gear wheel D meshes with an intermediate gear wheel D', journaled on a stud D² held on a bracket F attached to the casing A of the washing machine. The intermediate gear wheel D' is in mesh with a gear wheel D³, secured on a shaft G, journaled in suitable bearings on the bracket F. On the shaft G is secured the driving pulley H, adapted to be rotated in one direction by a belt I, as hereinafter more fully described, the rotary motion of the shaft G and pulley being transmitted by the gear wheels D³, D' and D to the shaft B and the cylinder or drum C, to rotate the latter in one direction.

The gear wheel E is in mesh with a gear wheel J', secured to or formed on a pulley J, adapted to be driven by the belt I, the rotary motion of the pulley J being transmitted by the gear wheels J' and E to the shaft B and the drum or cylinder C, to rotate the latter in a reverse direction. The pulley J is mounted to turn loosely on the hub K' of a belt-shifter pulley K, mounted to rotate loosely on the shaft G, and arranged intermediate the driving pulleys H and J. The belt I is at all times in engagement with the belt-shifter pulley K, that is, the belt is of a width exceeding the width of the rims of the pulleys H and J, so that when the belt I is on either of the pulleys H and J it also extends onto the belt-shifter pulley K, whereby the latter is driven by the belt I as long as the latter is running.

The belt I controls a shifting device for automatically shifting the belt from the pulley H across the pulley K onto the pulley J, and from the pulley J across the pulley K back onto the pulley H. For the purpose mentioned the hub K' of the pulley K is provided with a gear wheel L in mesh with a gear wheel L', secured on a shaft L², journaled on the bracket F and carrying a worm N in mesh with a worm wheel N', having its shaft N² journaled in a bearing arranged on the bracket F.

The worm wheel N' is provided with a crank pin N³ extending into the slots O' of a link O, pivotally connected at O² with upwardly extending levers P, fulcrumed at P' on the bracket F. Secured to the upper ends of the levers P is the transversely-extending arm the levers P is the transversely-extending arm P², provided with a row of apertures P³, either of which is adapted to be engaged by a bolt Q' held on a belt shifter Q, engaging the driving belt I (see Figs. 3 and 4). By the arrangement described the belt shifter Q may be readily set to any angle at which the driving belt I may be placed.

The link O is provided with a handle O³ adapted to be taken hold of by the operator whenever it is desired to disconnect the link O from the wrist pin N³, the link O being for this purpose provided with an opening O⁴ leading to the slot O' at the inner end thereof, as plainly shown in Fig. 5. Thus when the operator bears down on the handle O³ at the time the wrist pin N³ is at the rear end of the slot O', then the wrist pin passes out of the opening O⁴, thus disconnecting the link O from the wrist pin N³. The link O can then be swung downward into engagement with a fork R, held on the bracket F, to support the link O in position while disengaged.

The operation is as follows: When the several parts are in the position illustrated in the drawings, then the running belt I is in engagement with the driving pulley H and the belt-shifter pulley K, so that both are rotated in the same direction. Now the rotation of the pulley H is transmitted to the shaft B and the drum or cylinder C, as previously described, to rotate the drum C in one direction. The rotation of the pulley K causes the gear wheels L and L' to rotate the worm N and the worm wheel N', so that the latter imparts a swinging motion to the levers P by means of the link O and wrist pin N³, at the time the wrist pin N³ reaches the outer end of the slot O'. Now when this takes place and the levers P are swung in the direction of the arrow a', then the belt shifter Q moves the belt I from the pulley H, across the pulley K and finally onto the pulley J, so that the rotary motion of the pulley H ceases and consequently that of the drum or cylinder C. Now as soon as the belt I reaches the pulley J, the latter is rotated and with it the pulley K, as previously explained, so that the drum or cylinder C is now rotated in a reverse direction owing to the driving of the pulley J and the transmission of the power by way of the gear wheels J' and E to the shaft B. The pulley J is driven until the worm wheel N' has completed about a quarter revolution and the wrist pin N³ has traveled back in the slot O' to the inner end thereof, and when this takes place, the link O is pushed to the right, thus imparting a return swinging motion to the lever P, whereby the belt I is shifted from the pulley J across the pulley K back onto the pulley H. Now when the belt I leaves the pulley J, the rotary motion of the said pulley and the drum or cylinder C ceases, and when the belt I reaches the pulley H it rotates the latter, so that the drum or cylinder C is again driven in the opposite direction. From the foregoing it will be seen that the pulley K is at all times driven by the running belt I, while the pulleys H and J rotate alternately with the shifter pulley K for turning the shaft B and the drum or cylinder C alternately in a forward and reverse direction. It will further be noticed that by the wrist pin N³ engaging the slot O', the belt I remains sufficiently long on either pulley H or J, to give the requisite number of revolutions to the shaft B and the drum or cylinder C, before the reverse movement takes place. When it is desired to stop the machine, the operator bears down on the handle O³ at the time the belt I is wholly on the indermediate pulley K and out of engagement with either of the pulleys H or J, so that the link O becomes disconnected from the wrist pin N³, and the rotary motion of the shaft B and the drum or cylinder C soon comes to a standstill. The pulley K and the gear wheels L, L', worm N and worm wheel N' keep on running unless the traveling motion of the belt I is stopped.

The mechanical movement shown and described is simple and durable in construction, very effective in operation, and not liable easily to get out of order.

Having thus described my invention, I claim as new and desire to secure by Letters Patent:

1. A mechanical movement comprising a shaft, a driving pulley secured thereon, a belt-shifter pulley loosely mounted on the shaft, a second driving pulley loosely mounted on the hub of the belt-shifter pulley, the latter being intermediate of the driving pulleys, gearings connecting the shaft and the loose-driving pulley with the part to be driven, and a belt-shifting device actuated by the belt-shifter pulley.

2. A mechanical movement, comprising a shaft, a driving pulley secured to the shaft, a belt-shifter pulley loose on the shaft, a second driving pulley loosely mounted on the hub of the belt-shifter pulley, the latter being between the driving pulleys, gearings connecting the shaft and the loose driving pulley with the part to be driven, a belt shifting device actuated by the belt-shifter pulley, and a manually controlled device for throwing the belt shifting device out of action.

3. A mechanical movement comprising a shaft, a driving pulley secured thereon, a belt-shifter pulley mounted to rotate loosely on the said shaft, a second driving pulley mounted to rotate loosely on the hub of the said belt-shifter pulley, the latter being intermediate the said driving pulleys, a driving belt for the said pulleys, gearings connecting the said shaft and the said loose-driving pulley with the part to be driven, and a belt-shifting device for the said belt and having a crank wheel driven from the said belt-shifter pulley, a shifting lever for engaging the said belt and a link connecting the said crank wheel with the said lever.

4. A mechanical movement comprising a shaft, a driving pulley secured thereon, a belt-shifter pulley mounted to rotate loosely on the said shaft, a second driving pulley mounted to rotate loosely on the hub of the said belt-shifter pulley, the latter being intermediate the said driving pulleys, a driving belt for the said pulleys, gearings connecting the said shaft and the said loose-driving pulley with the part to be driven, and a belt-shifting device for the said belt and having a crank wheel driven from the said belt-shifter pulley, a shifting lever for engaging the said belt, and a link connecting the said crank wheel with the said lever, and provided with a slot, and a handle for swinging the link out of engagement with the said crank wheel.

5. A mechanical movement comprising, a shaft, two driving pulleys, one turning with the shaft and the other free to turn independently of said shaft, a belt-shifter pulley loosely mounted on the shaft between the driving pulleys, gearings connecting the shaft and the loose driving pulley with the part to be driven, a pivoted belt-shifting device, a crank shaft driven from the belt-shifter pulley, and a link connecting the belt-shifting device with the crank of said shaft, said link having means whereby it may be detached from the said crank to throw the belt shifter out of action.

6. A mechanical movement comprising two driving pulleys geared with the part to be driven, a belt-shifter pulley between the driving pulleys, a pivoted belt-shifter, a crank shaft operated by the belt-shifter pulley, and a link connecting the belt-shifter with the crank of said shaft, the end of the link engaging the crank being slotted and having an opening leading from said slot.

7. A mechanical movement comprising a shaft, a driving pulley secured to the shaft, a belt-shifter pulley loosely mounted on the shaft and having an elongated hub, a second driving pulley loosely mounted on the hub of the belt-shifter pulley, gearings connecting the shaft and the loose driving pulley with the part to be driven, a crank shaft, gearing for operating the crank shaft from the belt-shifter pulley, a pivoted belt-shifter, and a link connecting the crank of the said shaft with the belt shifter.

In testimony whereof I have signed my name to this specification in the presence of two subscribing witnesses.

DE WITT OTIS MAKEAN.

Witnesses:
HERBERT I. WALKER,
JOHN J. IRVING.